W. G. Tuttle,
Saw.
Nº 37,835.   Patented Mar. 3, 1863.
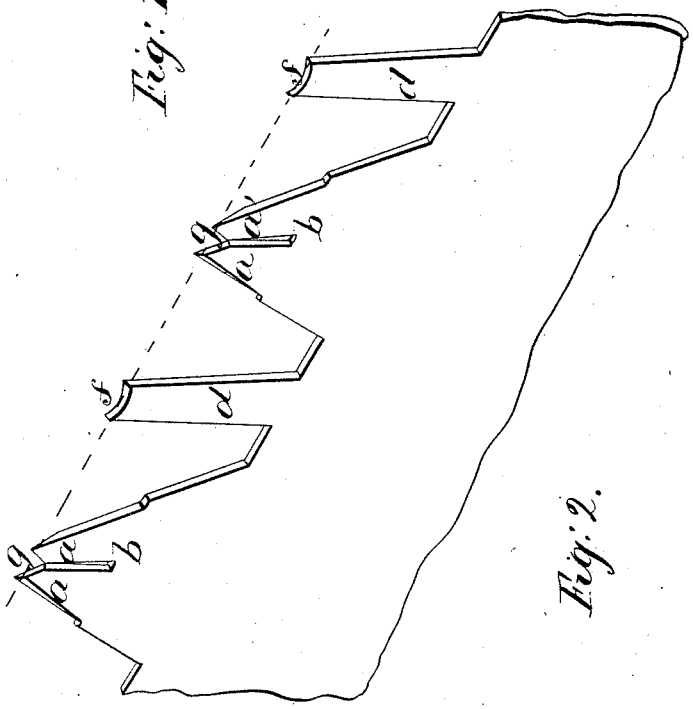
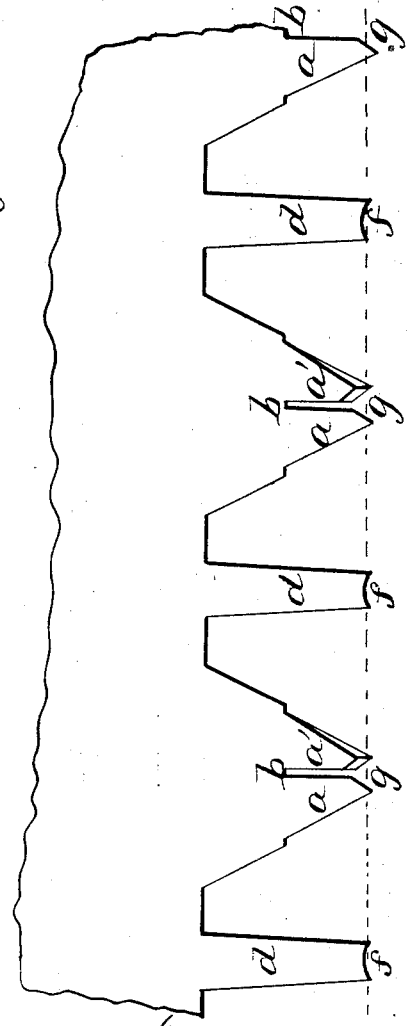
Witnesses;
R. F. Osgood
N. Serross
Inventor;
W. G. Tuttle,
by J. Fraser &c, attys

UNITED STATES PATENT OFFICE.

WILLIAM G. TUTTLE, OF GENEVA, NEW YORK.

IMPROVEMENT IN SAWS.

Specification forming part of Letters Patent No. 37,835, dated March 3, 1863.

*To all whom it may concern:*

Be it known that I, WILLIAM G. TUTTLE, of Geneva, in the county of Ontario and State of New York, have invented a new and useful Improvement in Saws; and I do hereby declare that the following is a full and exact description thereof, reference being had to the accompanying drawings, making part of this specification—

Figure 1 being a perspective view of a section of a reciprocating saw with my improvement; Fig 2, a side view of the same.

Like letters designate corresponding parts in both figures.

My present invention is an improvement on the patent allowed to me January 6, 1863, and relates to that class of saws in which the cutting, "fleam," or "set" teeth are arranged in pairs, with intermediate alternating clearing-teeth, for removing the dust and chips from the kerf and cutting down the middle of the same.

My present invention has particular reference to the construction of the clearing-teeth, in combination with the alternate pairs of cutting or fleam teeth, which may be described in the same language as in my patent above referred to—viz:

"I make each pair of the cutting-teeth $a$ and $a'$ combined in the usual triangular pointed form of a single ordinary tooth, but a little larger, to give sufficient strength, and with a narrow central slit or opening, $b$, between them, as represented. The points of these teeth are thus situated closely together, nearly opposite each other laterally. They may be set, respectively, in opposite directions, and their points filed, from the inside outward, to a sharp edge, and also notched slightly at the apex," as shown at $g$. The clearing-teeth used in combination with these cutting ones, are described in my patent above referred to as "single straight teeth, alternating with the pairs of cutters, being made a little shorter than the latter, and which may be blunt or obtuse at the point, as their office is alone to clear the kerf of dust."

The operation of these clearing-teeth is found by trial to present one practical difficulty—namely, that they present so much unbroken surface in their blunt ends to the wood that it causes the saw to slip, or, in other words, prevents the cutting-teeth from taking and maintaining a good cutting-hold on the timber, the effect being somewhat similar to that of using the back of the saw to the wood. This difficulty cannot be obviated by making the clearers narrow or nearly pointed at the end, from the fact that their edges must be nearly vertical, or they will not scrape the dust and chips before them, but compress and be drawn over the same, and to form them as narrow as would be required to preserve the proper angle and make their ends sufficiently sharp or pointed would so weaken them that they would break from the first knot or other unusually hard part of the timber with which they come in contact, especially in cross-sawing small sticks, where the saw cuts but a small diameter, and is consequently most exposed.

This difficulty is obviated by my present invention, which consists in making the clearing-teeth $d\ d$ of sufficient width at the extremity to insure strength — usually about three-eighths of an inch in a large-sized cross-cut-saw, though it will vary considerably with the thickness of the blade and number and size of the cutting teeth. Instead of leaving them square or blunt, as in my former arrangement, I make them concave or notched, as clearly represented at $f$. This produces a certain degree of sharpness or pointedness at each corner of the end and allows the edge or side of the tooth to be made as nearly vertical as may be desired, without diminishing the necessary width or lessening its strength, and preserving at the same time the desired regularity of form, being straight and occupying hardly more space than in my former arrangement, thus insuring economy of space on the saw-blade and of labor in filing, which cannot be attained by the hook or any other form. Thus arranged, the effect is not only to scrape away the dust and chips, but also to partially cut the wood or clear the kerf of the projecting parts left by the cutting-teeth, which, from being made pointed, the clearer readily does. Its action may be compared to that of a blunt chisel, which adheres to the wood sufficiently to hold the cutting-teeth to their work and thereby renders their cutting steady and uniform, instead of irregular, as when the saw slips.

The clearers are kept sharp by dressing with a round file in the concave of the end.

It is obvious that the end of the teeth may be notched at a very obtuse angle and produce the same effect; but I prefer to make the ends concave, as most convenient and symmetrical.

The advantage of having the cutting-teeth arranged in pairs, by which a greater number may be employed in the same space and are rendered more efficient in consequence, which was impaired in my former invention, is now greatly enhanced by the perfect action of the clearers, which leave the cutters entirely unobstructed by dust.

What I claim as my invention, and desire to secure by Letters Patent, is—

The employment of alternate clearing-teeth $d\ d$, the ends of which are concave or notched, so as to form sharp or pointed corners, in combination with the triangular pairs of cutting-teeth $a\ a'$, arranged on a single saw-blade, substantially as and for the purposes herein set forth.

In witness whereof I have hereunto signed my name in the presence of two subscribing witnesses.

W. G. TUTTLE.

Witnesses:
R. F. OSGOOD,
J. FRASER.